(12) United States Patent
Mansfield et al.

(10) Patent No.: US 8,344,529 B2
(45) Date of Patent: Jan. 1, 2013

(54) METHOD AND SYSTEM FOR ENERGY HARVESTING

(75) Inventors: Richard James Walter Mansfield, Cambridge, MA (US); Daniel Shani, Newton, MA (US); Nissim Shani, Newton, MA (US)

(73) Assignee: Energy Intelligence, LLC, Newton, MA (US)

( * ) Notice: Subject to any disclaimer, the term of this patent is extended or adjusted under 35 U.S.C. 154(b) by 0 days.

(21) Appl. No.: 13/135,493

(22) Filed: Jul. 7, 2011

(65) Prior Publication Data

US 2012/0181796 A1 Jul. 19, 2012

Related U.S. Application Data

(60) Provisional application No. 61/461,414, filed on Jan. 18, 2011.

(51) Int. Cl.
F02B 63/04 (2006.01)
F03G 7/08 (2006.01)
H02K 7/18 (2006.01)

(52) U.S. Cl. ..................................... 290/1 R
(58) Field of Classification Search .................. 290/1 R
See application file for complete search history.

(56) References Cited

U.S. PATENT DOCUMENTS

| | | | | |
|---|---|---|---|---|
| 159,660 A * | 2/1875 | Faivre | ......................... | 417/229 |
| 1,391,503 A * | 9/1921 | Register | ....................... | 417/229 |
| 1,771,200 A * | 7/1930 | Akers | ........................... | 417/229 |
| 1,916,873 A * | 7/1933 | Wiggins | ........................ | 185/39 |
| 2,020,361 A * | 11/1935 | Johnston | ....................... | 417/214 |
| 2,060,890 A * | 11/1936 | Olafson | ........................... | 92/94 |
| 2,333,614 A * | 11/1943 | Boyd | ............................ | 417/229 |
| 3,885,163 A * | 5/1975 | Toberman | .................... | 290/1 R |
| 3,944,855 A * | 3/1976 | Le Van | ........................... | 310/69 |
| 4,004,422 A * | 1/1977 | Le Van | ........................... | 60/533 |
| 4,081,224 A * | 3/1978 | Krupp | .......................... | 417/229 |
| 4,173,431 A * | 11/1979 | Smith | .......................... | 417/229 |
| 4,212,598 A * | 7/1980 | Roche et al. | .................. | 417/229 |
| 4,238,687 A * | 12/1980 | Martinez | ....................... | 290/1 R |
| 4,239,974 A * | 12/1980 | Swander et al. | ............. | 290/1 R |
| 4,239,975 A * | 12/1980 | Chiappetti | ................... | 290/1 R |
| 4,247,785 A * | 1/1981 | Apgar | .......................... | 290/1 R |
| 4,322,673 A * | 3/1982 | Dukess | ......................... | 322/35 |
| 4,339,920 A * | 7/1982 | Le Van | .......................... | 60/533 |
| 4,409,489 A * | 10/1983 | Hayes | .......................... | 290/1 R |
| 4,418,542 A * | 12/1983 | Ferrell | ......................... | 60/668 |
| 4,437,015 A * | 3/1984 | Rosenblum | .................... | 290/1 R |
| 4,614,875 A * | 9/1986 | McGee | ......................... | 290/1 R |
| 4,739,179 A * | 4/1988 | Stites | ........................... | 290/1 R |
| 4,980,572 A * | 12/1990 | Sen | ................................. | 290/1 R |
| 5,157,922 A * | 10/1992 | Baruch | ........................... | 60/325 |
| 5,355,674 A * | 10/1994 | Rosenberg | ...................... | 60/325 |
| 5,634,774 A * | 6/1997 | Angel et al. | .................. | 417/229 |
| 5,710,558 A * | 1/1998 | Gibson | ......................... | 340/933 |
| 6,091,159 A * | 7/2000 | Galich | .......................... | 290/1 R |
| 6,172,426 B1 * | 1/2001 | Galich | .......................... | 290/1 R |
| 6,204,568 B1 * | 3/2001 | Runner | ......................... | 290/1 R |
| 6,353,270 B1 * | 3/2002 | Sen | ................................. | 290/1 R |
| 6,362,534 B1 * | 3/2002 | Kaufman | ..................... | 290/1 R |

(Continued)

*Primary Examiner* — Pedro J Cuevas
(74) *Attorney, Agent, or Firm* — William A. M. Mansfield

(57) ABSTRACT

A power-recapture method and system converts mechanical energy, which would otherwise be dissipated, into available electrical energy. A plurality of computer-coordinated Electric Generators are arranged with salient sensors that detect appropriate motion then adjust the phasing and intensity of electromagnets of the Electric Generator to optimally convert variable mechanical motion into electric current.

20 Claims, 9 Drawing Sheets

U.S. PATENT DOCUMENTS

| | | | |
|---|---|---|---|
| 6,376,925 B1* | 4/2002 | Galich | 290/1 R |
| 6,602,021 B1* | 8/2003 | Kim | 404/16 |
| 6,726,398 B2* | 4/2004 | Hamakawa et al. | 404/13 |
| 6,767,161 B1* | 7/2004 | Calvo et al. | 404/71 |
| 6,936,932 B2* | 8/2005 | Kenney | 290/1 R |
| 7,067,932 B1* | 6/2006 | Ghassemi | 290/1 R |
| 7,102,244 B2* | 9/2006 | Hunter, Jr. | 290/1 R |
| 7,145,257 B2* | 12/2006 | Ricketts | 290/1 R |
| 7,239,031 B2* | 7/2007 | Ricketts | 290/1 R |
| 7,258,507 B2* | 8/2007 | Kim et al. | 404/15 |
| 7,315,088 B2* | 1/2008 | Erriu | 290/1 R |
| 7,347,643 B2* | 3/2008 | Jeong | 404/13 |
| 7,432,607 B2* | 10/2008 | Kim et al. | 290/1 R |
| 7,495,351 B2* | 2/2009 | Fein et al. | 290/1 R |
| 7,528,528 B2* | 5/2009 | Zanella et al. | 310/339 |
| 7,541,684 B1* | 6/2009 | Valentino | 290/1 R |
| 7,547,980 B2* | 6/2009 | Harrison | 290/1 R |
| 7,589,427 B2* | 9/2009 | Davis | 290/1 R |
| 7,589,428 B2* | 9/2009 | Ghassemi | 290/1 R |
| 7,902,690 B1* | 3/2011 | Van Meveren et al. | 290/55 |
| 8,123,431 B2* | 2/2012 | Chen | 404/71 |
| 8,148,833 B2* | 4/2012 | Chang et al. | 290/1 R |
| 8,164,204 B2* | 4/2012 | Jang | 290/1 R |
| 8,232,661 B2* | 7/2012 | Cannarella | 290/1 R |
| 2003/0034652 A1* | 2/2003 | Slatkin | 290/1 R |
| 2004/0066041 A1* | 4/2004 | Hunter, Jr. | 290/1 R |
| 2004/0130158 A1* | 7/2004 | Kenney | 290/1 R |
| 2005/0200132 A1* | 9/2005 | Kenney | 290/1 R |
| 2006/0152008 A1* | 7/2006 | Ghassemi | 290/1 R |
| 2006/0193691 A1* | 8/2006 | Gonzalez et al. | 404/15 |
| 2007/0228890 A1* | 10/2007 | Zanella et al. | 310/339 |
| 2007/0246940 A1* | 10/2007 | Fajardo Valon | 290/1 R |
| 2007/0280781 A1* | 12/2007 | Jeong | 404/16 |
| 2008/0106103 A1* | 5/2008 | Owens | 290/1 R |
| 2008/0149403 A1* | 6/2008 | Fein et al. | 180/2.2 |
| 2008/0150295 A1* | 6/2008 | Fein et al. | 290/1 R |
| 2008/0150296 A1* | 6/2008 | Fein et al. | 290/1 R |
| 2008/0157537 A1* | 7/2008 | Richard | 290/1 R |
| 2008/0224477 A1* | 9/2008 | Kenney | 290/1 R |
| 2009/0127865 A1* | 5/2009 | Valentino | 290/1 R |
| 2009/0179433 A1* | 7/2009 | Kenney | 290/1 R |
| 2009/0195124 A1* | 8/2009 | Abramovich et al. | 310/339 |
| 2009/0195226 A1* | 8/2009 | Abramovich et al. | 322/2 R |
| 2010/0045111 A1* | 2/2010 | Abramovich et al. | 307/43 |
| 2010/0072758 A1* | 3/2010 | Chang et al. | 290/1 R |
| 2010/0133855 A1* | 6/2010 | Daya | 290/1 R |
| 2010/0244629 A1* | 9/2010 | Nagashima et al. | 310/339 |
| 2010/0327602 A1* | 12/2010 | Jordan | 290/1 R |
| 2011/0148121 A1* | 6/2011 | Kenney | 290/1 R |
| 2011/0215593 A1* | 9/2011 | Chang et al. | 290/1 R |
| 2011/0260472 A1* | 10/2011 | Barca | 290/1 R |
| 2011/0291526 A1* | 12/2011 | Abramovich et al. | 310/339 |
| 2011/0298222 A1* | 12/2011 | Bailey et al. | 290/1 R |
| 2012/0119624 A1* | 5/2012 | Vamvas | 310/339 |
| 2012/0169064 A1* | 7/2012 | Hoffman et al. | 290/1 R |
| 2012/0211996 A1* | 8/2012 | Jang | 290/1 R |

* cited by examiner

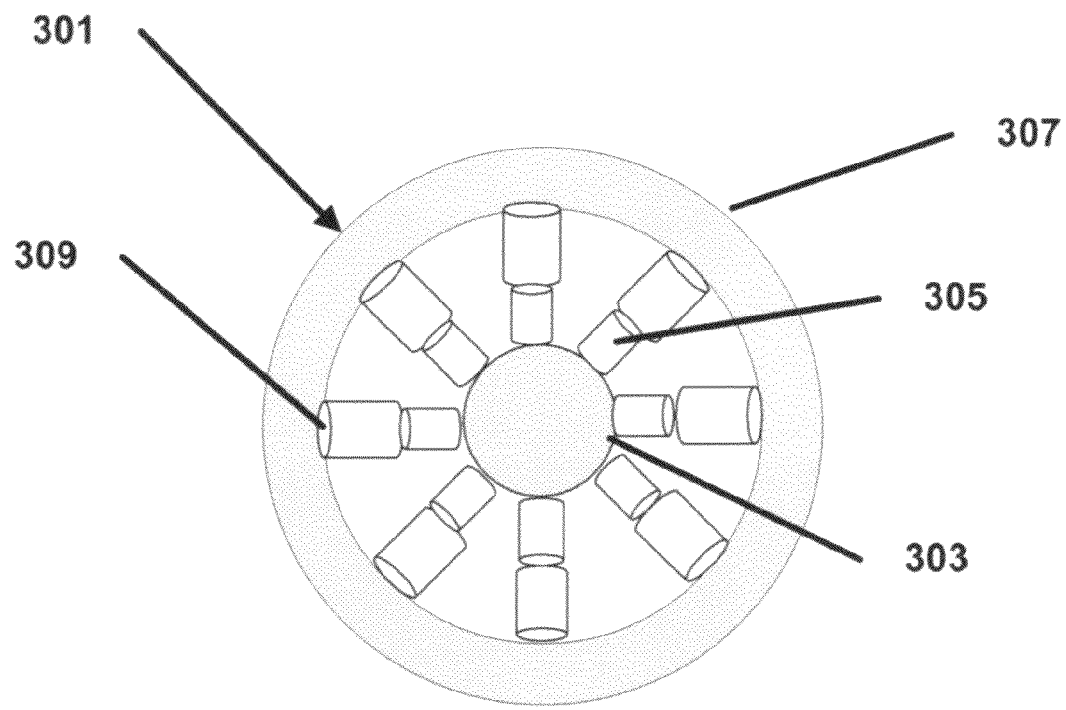
FIG. 2. Cross Section Schematic of Electric Generator Showing Arrangement of Electromagnets

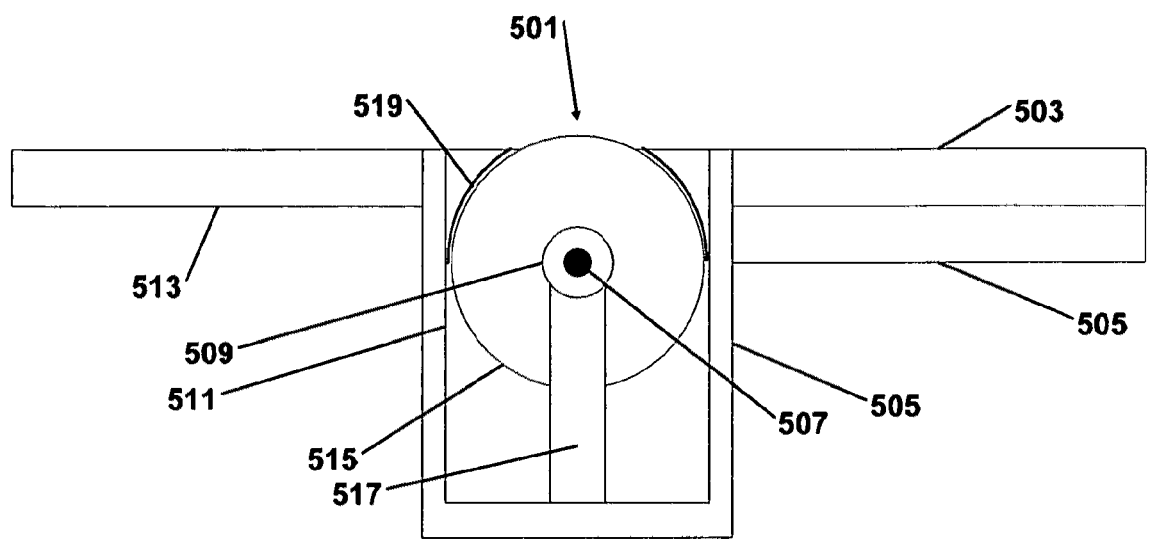
FIG. 3. Schematic Cross Sectional Diagram of a Power Generating Module Aligned with the Surface of a Roadway

FIG. 4. Top Down Schematic View of a Plurality of Adjacent Energy Harvesting Modules Showing Placement of Mechanical Energy Transducer, Electrical Generator, Mechanical Energy Transfer Connector, and Piezoelectric Plates
A. Multi-lane Arrangement
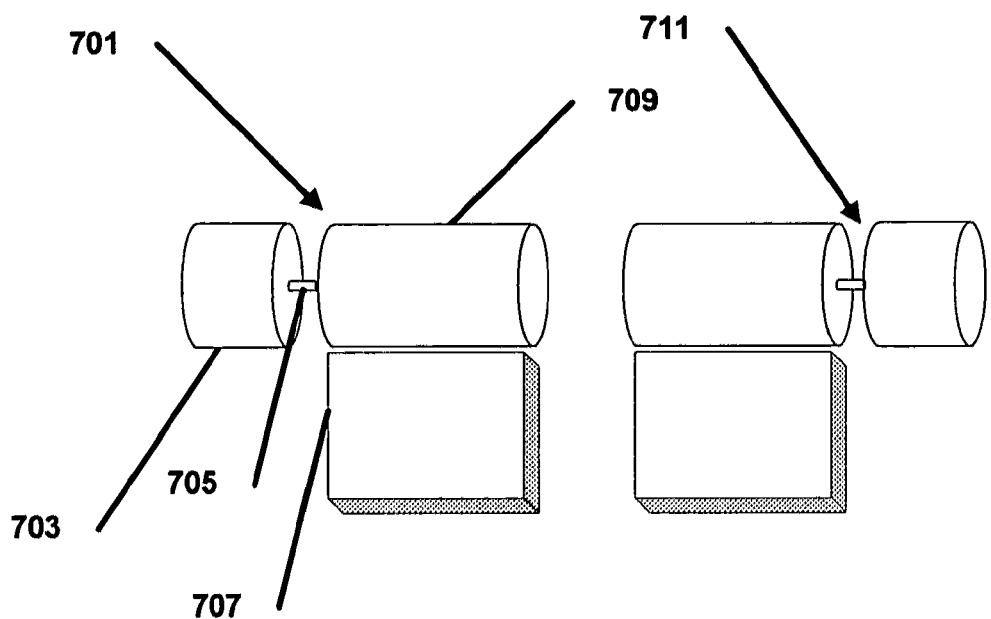
B. Single Lane Arrangement
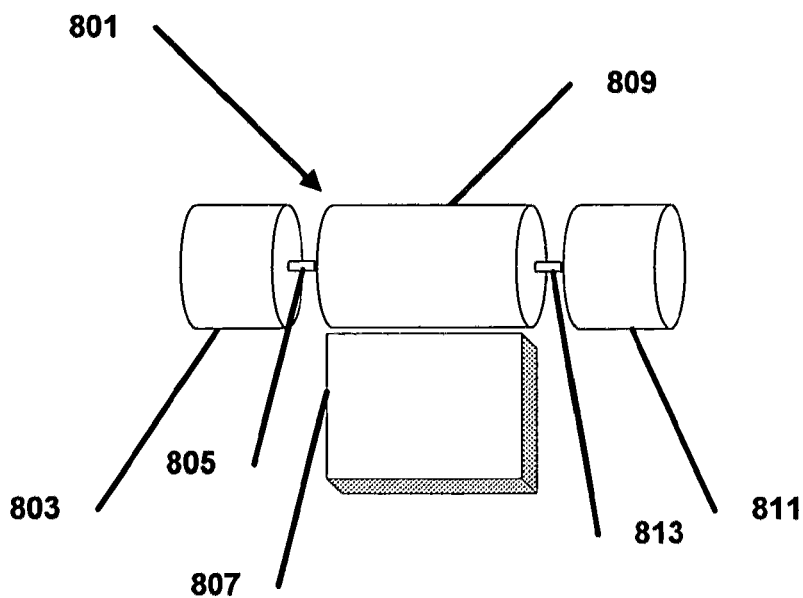

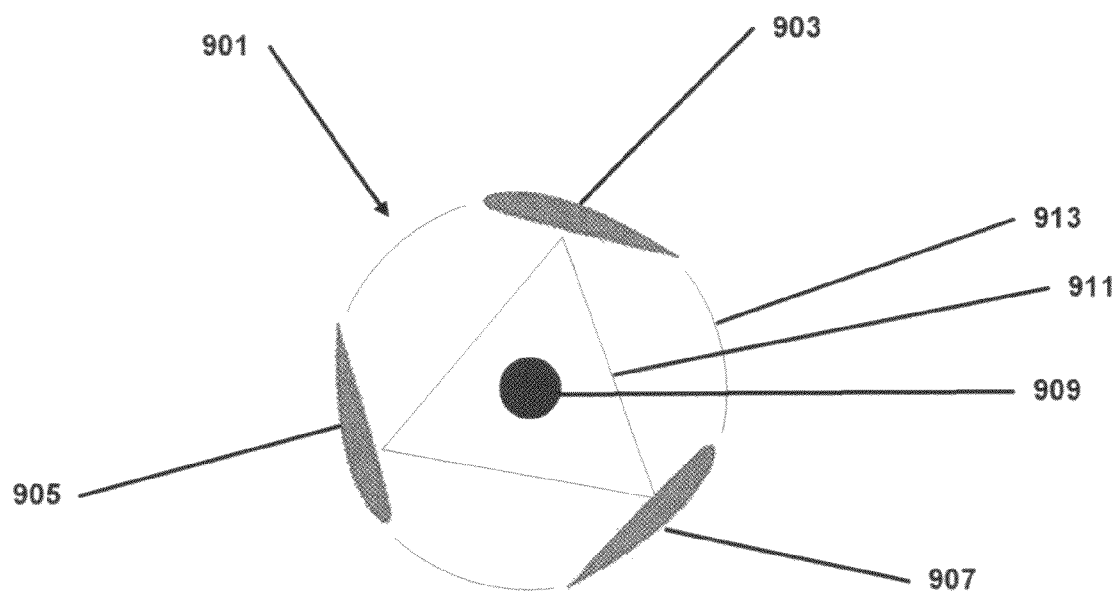
FIG. 5. Schematic Cross Sectional Diagram of a Vertical Wind Turbine Power Generating Module
A. Top View
A

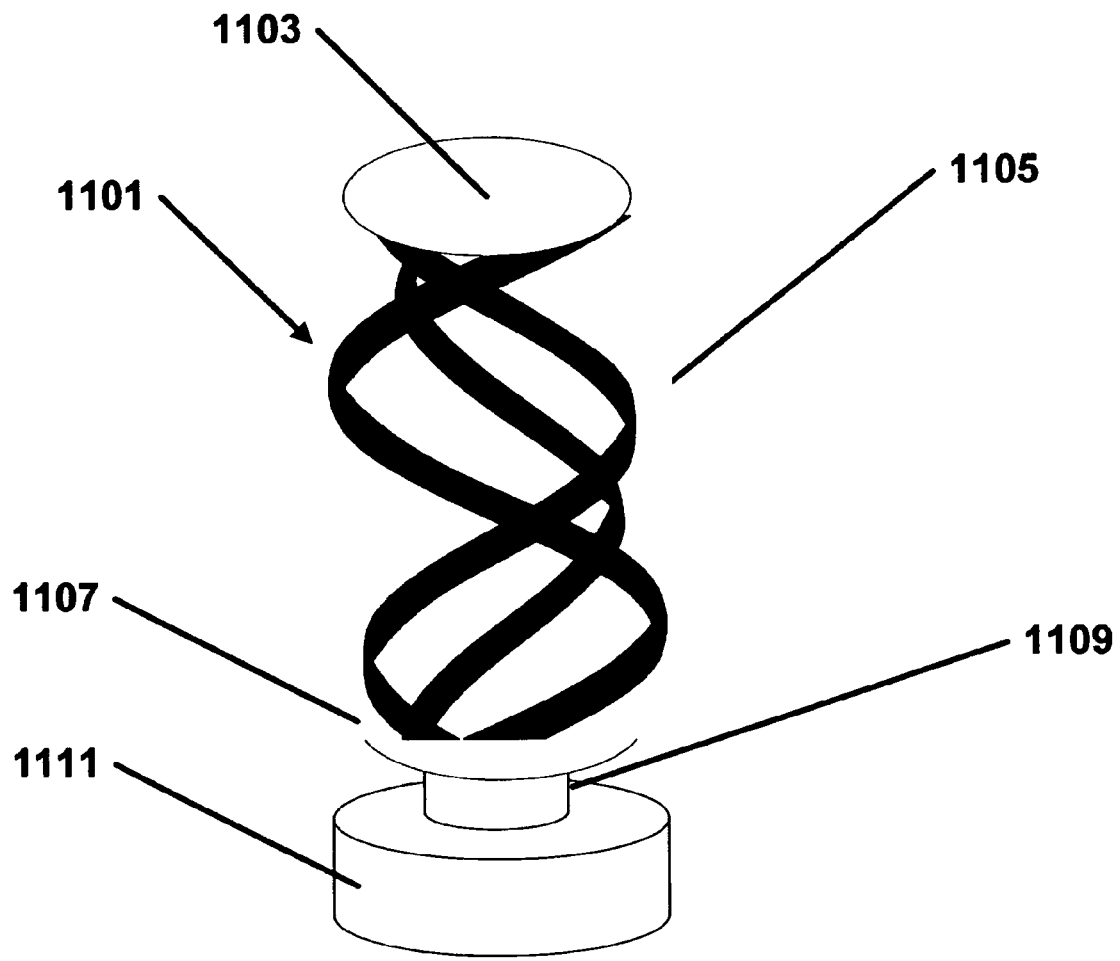
FIG. 5. Schematic Cross Sectional Diagram of a Vertical Wind Turbine Power Generating Module
B. Lateral View
B FIG. 5. Schematic Cross Sectional Diagram of a Vertical Wind Turbine Power Generating Module
C. Cross Section Schema showing Electric Generator Mounting
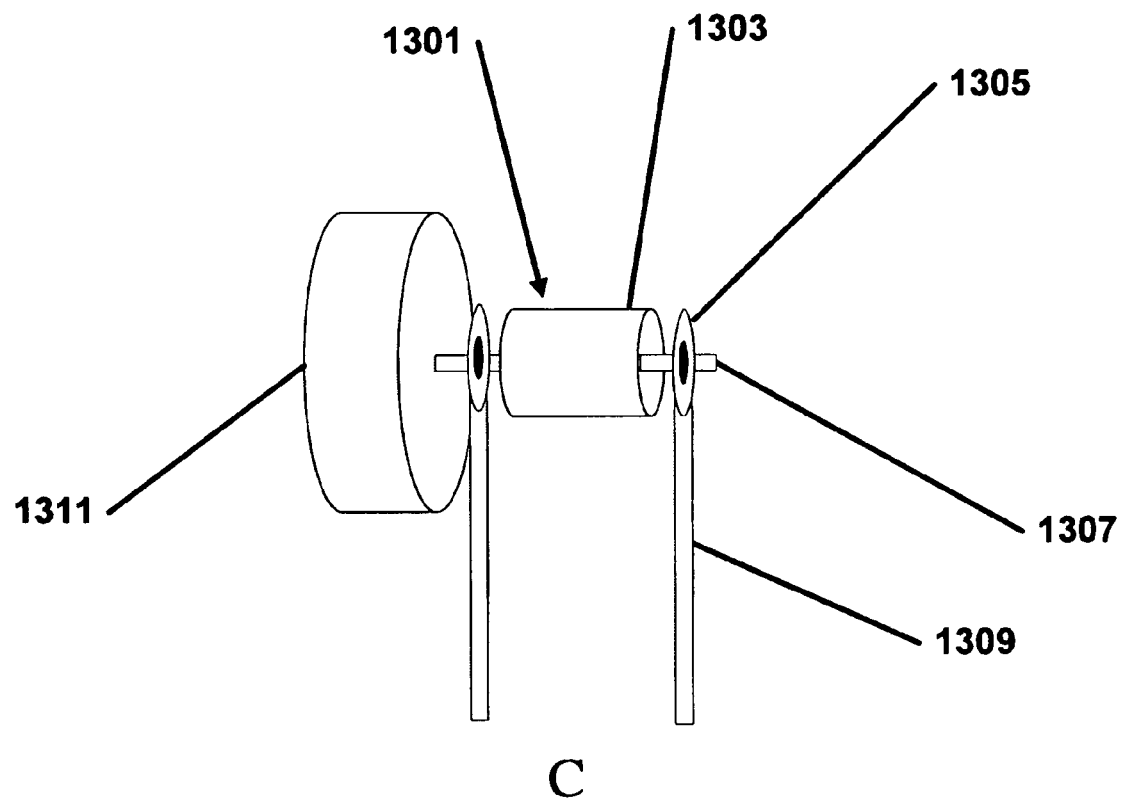
C FIG. 6. Schematic Cross Sectional Diagram of a Plurality of Energy Harvesting Modules Comprising a Vertical Wind Turbine Power Generating Farm
A. Top View
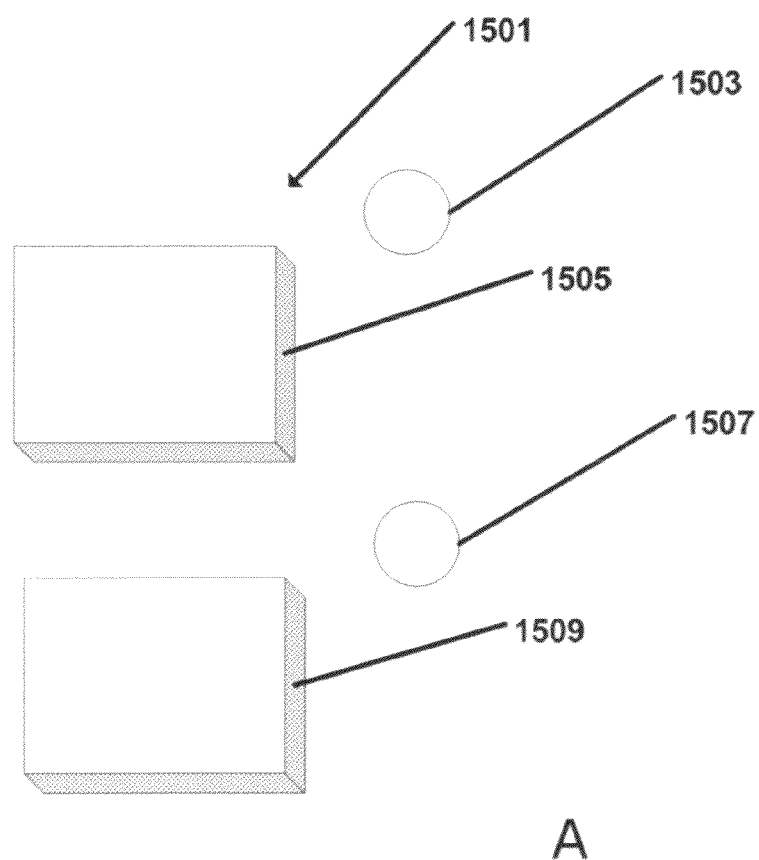
A FIG. 6. Schematic Cross Sectional Diagram of a Plurality of Energy Harvesting Modules Comprising a Vertical Wind Turbine Power Generating Farm
B. Front View
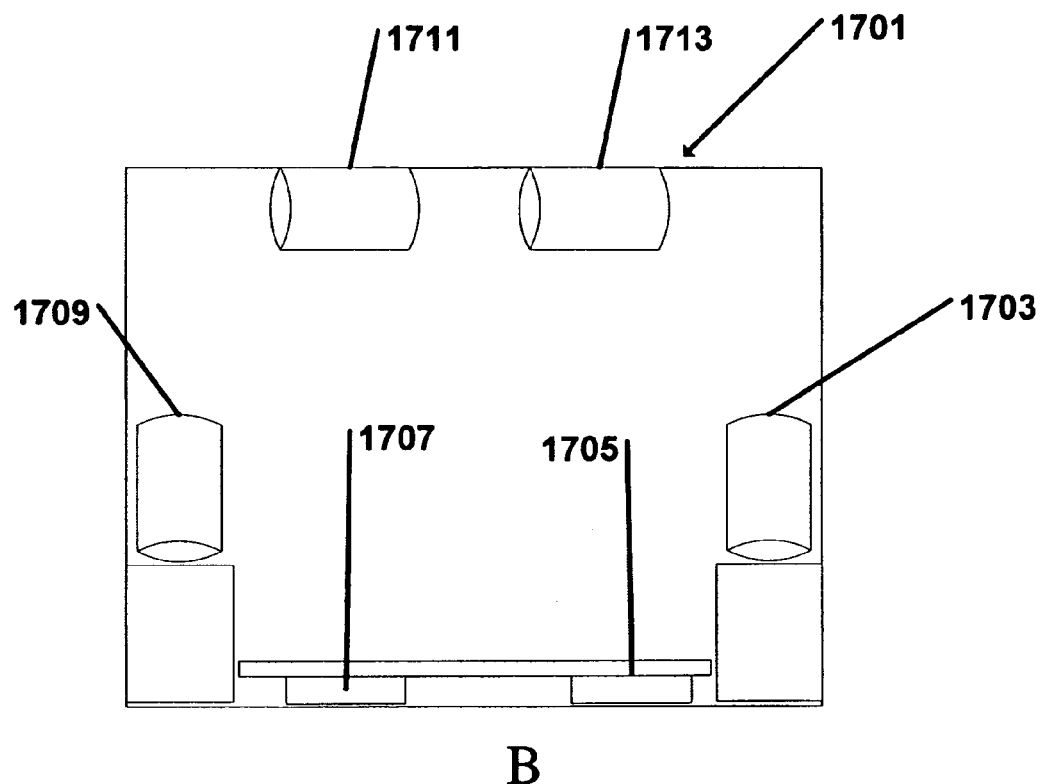
B

METHOD AND SYSTEM FOR ENERGY HARVESTING

PRIOR APPLICATION

This present application claims under 35 U.S.C. 119(e) the benefit of the prior filing date of Application number 61/461,414 filed on Jan. 18, 2011.

REFERENCES CITED

U.S. PATENT DOCUMENTS

| Number | Inventors | Issue Date | US Classification |
|---|---|---|---|
| 5,642,984 | Gorlov | July 1997 | 416/176 |
| 6,155,892 | Gorlov | December 2000 | 440/9 |
| 6,407,484 | Oliver et al. | June 2002 | 310/339 |
| 7,023,160 | Virtanen and Pasuri | April 2006 | 318/438 |
| 7,429,801 | Adamson et al. | September 2008 | 310/339 |

TECHNICAL FIELD

The present invention relates generally to electrical energy generation from mechanical forces, more particularly, from piezoelectric effects, and from electromagnetic effects.

BACKGROUND

Energy conservation and climate change mitigation have fostered the development of alternatives to the direct use of fossil fuels. Light to electrical energy conversion in the form of solar panels is one alternative but this has limitation due to:
  a. The large area required for efficient generation in urban areas so that the real estate available is mainly confined to residential or building roofs.
  b. The remote geographical locations of the regions with the optimal days per year of sunlight so that the power transfer losses for connecting to the National Power Grid become significant.

Electrical energy generated by conventional wind turbines has similar limitations. In contrast the present invention takes advantage of existing real estate to provide dual use; moreover, the power is generated close to potential usage sites and users. One valuable source of energy is that generated by the movement of vehicular traffic. For combustion engine vehicles the engine reaches sufficient temperatures that the heat must be dissipated usually with a coolant system although for smaller engines air cooling will suffice. For a conventional automobile powered by internal combustion, the energy efficiency is about 20% with the remaining 80% dissipated as heat. Some of the kinetic energy can be harvested and some of the frictional heat avoided with the present invention.

Vehicular traffic generates and then dissipates energy in at least four forms.
  1. The weight of the vehicle exerts pressure on the surface over which it passes. In the United States the average car, SUV or light truck, according to the US Department of Transportation, weighs approximately 4000 lbs (1814 kg). Assuming uniform distribution of weight, each wheel of a four-wheeled vehicle supports 1000 lbs (454 kg). With a contact surface of 32 square inches (206 square centimeters) the pressure would be 21.5 newtons per square centimeter. A portion of this pressure differential is harvested with the Piezoelectric Sensors of the present invention.
  2. The translational kinetic energy of a moving object, E sub t, is $½ mv^2$. So the energy possessed by a 4000-lb (1814-kg) vehicle traveling at 60 mph (27 m/s) is $½ (1814) (27)^2$ or 1.32 million joules which in electrical terms is equivalent to 367 Kilowatt-hours. There are 250 million such vehicles in the United States so if all were in motion at highway speeds they would constitute 91.8 billion Kilowatt-hours which is the electrical energy sufficient for 8.3 million homes for an entire year. In heavy traffic around any major city or on the major highways several hundred vehicles may pass by a single point in a given hour so the energy harvesting potential is significant. But that energy is dissipated usually in the form of heat when the vehicles brake (see below). If some portion of that energy could be recaptured rather than dissipated, the savings would be considerable. The linear or rotational displacement of the vehicle over the surface on which it travels exerts an equal and opposite force between the vehicle's wheels and the surface. A portion of this force differential is harvested by the Electric Generator of the present invention.
  3. A vehicle's motion displaces its surrounding fluid even when drag is minimized through efficient aerodynamic design. According to the US Energy Information Administration on average 5.3% of the energy required to move a vehicle is needed to push the air off the path of the vehicle. The motion of the displaced fluid outside the laminar flow zone around a vehicle presents a source of energy to be harvested by the present invention as described in the second preferred embodiment.
  4. As a vehicle slows or brakes to a stop the kinetic energy is typically dissipated as heat. However, such kinetic energy can be harvested by the present invention as described in the preferred embodiments.

The present invention is a power-recapture method and system for converting mechanical energy that would otherwise be dissipated into available electrical energy. Said invention teaches an innovative and comprehensive approach to energy harvesting from vehicular and ambient motion and has advantages over prior art by deploying the system in close proximity to energy-consuming users and devices.

SUMMARY

The present invention overcomes the limitations of conventional approaches by providing a power-recapture method for energy that would otherwise be dissipated; and by deploying the system in close proximity to energy-consuming users and devices.

The invention comprises six interconnected functional components:
  1. Mechanical Energy Capture Device for transforming linear mechanical motion into rotational mechanical force.
  2. Electric Generator for alternating current generation from mechanical rotational force.
  3. Piezoelectric plate sensing approaching objects and generating electrical power for the electromagnets in the Electric Generator to maximize efficiency at high rates of rotation. Secondarily the power will be stored in the battery noted below, or supplied to the National Power Grid.
  4. Controller with rectifiers to convert the output of the one or more Electric Generators and Piezoelectric Plates to direct current for storage or with suitable phase control to the National Power Grid; and for supplying current to the electromagnets of one or more Electric Generators 5. Storage Battery to retain the energies generated by one or more Electric Generators and by one or more Piezoelectric Plates.
6. Computer to coordinate and monitor the power generation for maximum efficiency. The Computer can be wirelessly connected to the internet for remote monitoring and control.

It will be appreciated that these functional components may be combined to serve the same functional purposes, for example, the Mechanical Energy Capture Device and the Electrical Generator may be combined such that the external surface of the Electrical Generator serves to capture mechanical energy for said Generator's rotor; similarly, the Computer for monitoring and coordination and the Controller may be combined to serve monitoring, coordination and power conditioning. It will be appreciated that one functional component may interact with a plurality of other functional components, for example, the Mechanical Energy Capture Device may drive more than one Electrical Generator; similarly, the Computer and Controller may monitor, coordinate and power condition more than one Electrical Generator and Storage Battery. It should be understood that any such combination of the functional components described herein is within the scope of the present invention.

In one embodiment, a stationary member, the piezoelectric plate is positioned to receive compression strain as a wheeled vehicle advances over the surface below which the plate is mounted. The electrical signal thus generated serves to activate the electromagnets of the Electric Generator as a wheeled vehicle passes over a portion of the outer rotor of the Mechanical Energy Capture Device. The frictional contact of a wheel of the wheeled vehicle serves to transfer rotational energy from the wheel to the dynamic outer rotor of the Mechanical Energy Capture Device that directly drives the rotor of the Electric Generator thus generating excess electrical energy that can be stored in the storage battery or with suitable phase control sent directly to the National Power Grid.

In a second embodiment, vehicular traffic or the transient wind itself exerts mechanical compression strain on a stationary member, a piezoelectric plate mounted in the path of the wheeled vehicle or at the suspension mount of the Mechanical Energy Capture Device. The electrical signal thus generated serves to activate the electromagnets of the Electric Generator as the Mechanical Energy Capture Device converts the translational air omnidirectional motion into rotational energy that directly drives the dynamic rotor of the Electric Generator thus generating excess electrical energy that can be stored in the storage battery or with suitable phase control sent directly to the National Power Grid.

DETAILED DESCRIPTION OF PREFERRED EMBODIMENTS

Figure 1:
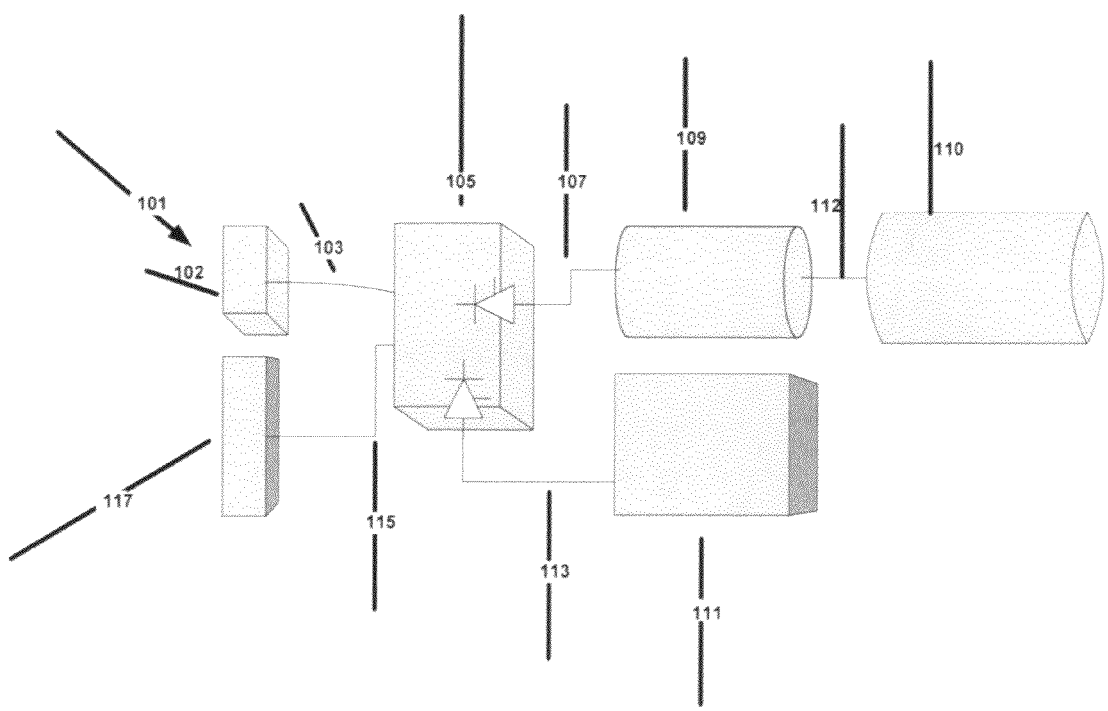
FIG. 1. Schematic Diagram of the Power Generating Circuit
FIG. 2. Cross Section Schematic of Electric Generator Showing Arrangement of Electromagnets
FIG. 3. Schematic Cross Sectional Diagram of a Power Generating Module Aligned with the Surface of a Roadway
FIG. 4. Top Down Schematic View of a Plurality of Adjacent Energy Harvesting Modules Showing Placement of Mechanical Energy Transducer, Electrical Generator, Mechanical Energy Transfer Connector, and Piezoelectric Plates
FIG. 5. Schematic Cross Sectional Diagram of a Vertical Wind Turbine Power Generating Module
FIG. 6. Schematic Cross Sectional Diagram of a Plurality of Energy Harvesting Modules Comprising a Vertical Wind Turbine Power Generating Farm

The present invention overcomes the limitations of conventional approaches by providing a power-recapture method for energy that would otherwise be dissipated; and by deploying the system in close proximity to energy-consuming users and devices. It will be appreciated that terms such as "left", "right", "top", "bottom", "inwardly", "outwardly", "front", "inner", "up", and "down" and other positional descriptive terms used herein below are used merely for ease of description and refer to the orientation of the components as shown in the Figures. It should be understood that any orientation of the elements described herein is within the scope of the present invention.

As shown in FIG. 1 the present invention provides for a system 101 for energy recapture and power generation comprising a cylindrical Electric Generator 109 positioned adjacent to a piezoelectric plate 111 both in electrical communication via 107, 113 with a circuit Controller 105. The system is positioned such that vehicles first pass over the region of the piezoelectric plate 111 before passing over the exposed portion of the Motion Energy Harvesting Device 110 that is directly coupled by a mechanical linkage 112 to the Electric Generator 109 to drive its rotor. The Controller 105 uses the sensing signal from the piezoelectric plate 111 to adjust via 107 the current flowing in the electromagnets of the said Electric Generator 109 to maximize the conversion of rotational mechanical energy captured by the Motion Energy Harvesting Device 110 which is then imparted to the rotor of the Electric Generator to electrical energy that is conveyed via 107 and 115 to the storage battery 117 or with appropriate phase conversion directly to the National Grid. A remotely communicating Computer 102 is in electrical communication with the Controller 105 via 103 for monitoring and supervision.

The Electric Generator 301 as shown in FIG. 2 has a plurality of electromagnets, e.g., 305 affixed to an inner rotor 303 that moves concentrically inside a stator 307 on which insulated conductors are wound around a second plurality of electromagnets, e.g., 309. The Generator is constructed in a star-connected, polyphase manner with electromagnetic field coils on both stator and rotor. The magnetic fields produced by the electromagnets, e.g., 305, intersect orthogonally with the insulated conductors producing electrical current flowing as shown in FIG. 1 through conductive path 107 to the Controller 105 and then on 115 to the storage battery 117.

In the first preferred embodiment of the present invention deployed on a motor vehicle road, the rotor 515 of the Motion Energy Harvesting Device 501 will receive an accelerating impetus when the passing vehicle has a translational velocity greater than the rotational velocity of said rotor even though the dwell time of an individual vehicular wheel on the Motion Energy Harvesting Device would be approximately six (6) milliseconds for a vehicle traveling 60 mph (27 m/s). So the maximum velocity of the said rotor would be that of the passing vehicles which in heavy traffic would be approximately the same to each other and the accelerating impetuses would be sufficiently frequent that the minimal losses of the low-friction support bearings described in FIG. 3 would not impact the rotational velocity. For example, with a 4-wheeled vehicle traveling at 60 mph (27 m/s), an Electrical Generator with a circumference of 0.3 m would have an equilibrium velocity of 81 rps. The Motion Energy Harvesting Device protrudes above the surface of the road by less than 10% of a standard speed bump and the brief time of transverse (6 msec) renders it imperceptible. The protrusion and transit time are determined by the diameter of the Motion Energy Harvesting Device relative to the mounting column 517 of the low-friction support bearings 509 and the placement of said column in the container module 505. For efficient transfer of kinetic energy the exposed area should match or exceed the road contact area of a vehicle's wheel.

Since one cycle of alternating current is produced each time a pair of field poles passes over a point on the stator's winding, the relation between speed and frequency is N=2 f/P, where f is the frequency in Hz (cycles per second). P is the number of poles (2, 4, 6 . . . ) and N is the rotational speed in revolutions per second. With an 8-pole Electrical Generator as illustrated in FIG. 2 the frequency would be 324 Hz that can be easily adjusted to meeting a National Power Grid frequency of 60 Hz in the United States or 50 Hz in other countries. The torque of the wound-rotor doubly-fed electric machine is dependent on both slip and position, which is a classic condition for instability. For stable operation, the frequency and phase of the multiphase AC power must be synchronized and fixed instantaneously to the speed and position of the shaft, which is not trivial at any speed and particularly difficult about synchronous speed where induction no longer exists. If these conditions are met, all the attractive attributes of the wound-rotor doubly-fed electric machine, such as high power density, low cost, ultra-high efficiency, and ultra-high torque potential, are realized without the traditional slip-ring assembly and instability problems. The computer-based Electronic Controller will enable the brushless wound-rotor doubly-fed Electric Generator with resulting high power density, low cost, ultra-high efficiency (estimated to exceed 90%), and, symmetrically in motor operation, with ultra-high torque potential. This arrangement has the feature that variations in rotor speed can still result in synchronous delivery of conditioned power to the National Power Grid. As shown in FIG. 3 the Motion Energy Harvesting Device 501 has its outer rotary circumference 515 supported axially 507 on both lateral ends by means of low-friction, heavy duty hydrostatic bearings 509. Vehicles moving over the module would apply downward force to the piezoelectric plate 505 below the surface layer of the road 503 in front of the Motion Energy Harvesting Device. The adjacent Electrical Generator is also supported laterally on both ends by low-friction, heavy duty hydrostatic bearings. Such edge-sealed hydrostatic bearings combine high-static stiffness, very-high rotational accuracy, and extremely high-resistance to vibration and low sensitivities to both high built-in motor temperature and imbalance force; they are wear-free and have higher damping than ball bearings; moreover, they have no friction at rest. Magnetic bearings have similar properties but require electrical power that would reduce the net energy output and hence the efficiency of the Energy Harvesting Module. A similar net-energy consideration favors mechanical coupling over magnetic coupling for the axes of the Motion Energy Harvesting Device and the Electrical Generator.

The axle of said Electrical Generator is mechanically coupled axially 507 to the Motion Energy Harvesting Device to transmit rotations in an adjacent sealed compartment so dust, salt or water cannot enter the Electrical Generator. The said mechanical coupling is such that the separate module housing the Motion Energy Harvesting Device can be easily removed and replaced for maintenance. The edge-sealed hydrostatic bearings are superior to ball bearings since ball bearings have short lives, require lubrication and introduce vibration. The exposed surface of the Motion Energy Harvesting Device in an environment that may involve dust, water, salt and other corrosive contaminants is the critical component that will require replacement.

As shown in FIG. 4, different arrangement can be made to accommodate different Harvesting Zones. FIG. 4A shows a plurality of Energy Harvesting Modules 701, 711 constituting an Energy Harvesting Farm is arranged across a vehicular roadway with each transversely adjacent Motion Energy Harvesting Device 709 and Electrical Generator 703 coupled mechanically by means of an axial rod 705 flanked by a sensing piezoelectric element 707. Piezoelectric sensors are positioned in the direction of motion of said moving vehicle and can serve as well regardless of the direction of motion of said vehicle. Each Motion Energy Harvesting Device has its axle mechanically coupled to that of its adjacent Electrical Generator in such a manner that the Motion Energy Harvesting Device can be decoupled and replaced easily should it become too worn or defective. Moreover, each Motion Energy Harvesting Device can drive two Electrical Generators, one on either side as shown in FIG. 4B with Electrical Generators 803 and 811. Alternately, the Motion Energy Harvesting Device could be functionally combined with the Electrical Generator into a single unit if the outer surface of the Electrical Generator rotor were directly exposed to vehicular traffic. Separating the two components into a simple rotary drum in the exposed compartment and the more complex and expensive Generator in a sealed compartment is a more economical design in the long run.

It will be understood that the assemblies shown in FIG. 3 and FIG. 4 can also be used on any surface over which the rotating wheels of an automobile, truck, or any other vehicle move. For example, commuter roads around major cities in the United States or commercial transport roads, such as, Brazil's BR-163, which connects the Matto Grosso to the port of Santarem, along which move multiaxial trucks, one third of the trucks equipped with seven or more axles, every 6 seconds during soybean harvest.

A shown in FIG. 3 a wheel of a moving vehicle transfers mechanical energy at the zone of contact 519 with the rotor of the Motion Energy Harvesting Device 515 that is directly connected as shown in FIG. 4 to the axis 705 driving the rotor of the Electric Generator 703. With dense traffic of passing vehicles, which are all moving in the same direction with approximately uniform speed, the rotor 515 will accelerate and maintain a rotational velocity equal in magnitude to the linear velocity of the passing vehicles.

The difference in velocity between the rotational velocity of the Electrical Generator and the speed of the passing vehicles will determine the amount of kinetic energy transferred to the Electrical Generator from the passing vehicles. Thus on a busy roadway on which the vehicles are traveling at the same speed, the energy harvesting from each individual vehicle is minimal but sufficient to keep each Electrical Generator fully powered. Deploying the invention on the approaches near a toll booth has additional benefits.

1. Since the vehicles are required to slow down any kinetic energy harvesting assists this goal.
2. The energy harvested could be used in part to power the operation of the nearby toll booth.
3. If the sensors of the invention determined that the speed of a particular vehicle constituted a safety hazard relative to other vehicles, the Electrical Generator could reverse rotational direction. Now the reversed Electrical Generator would function as a motor and serve as additional brakes for the runaway vehicle.

At 60 mph (27 m/s) a wheel would pass over and impart rotational energy to the cylindrical energy capture component, the Motion Energy Harvesting Device in an interval determined by the exposed contact surface. For an exposed surface of 0.15 m, the interval would amount to 5.6 msec. So, if as indicated previously, an average vehicle at the speed has kinetic energy amounting to 367 KWH, then each module of the present invention would capture 0.56% of that energy per wheel or 2.24% for a 4-wheeled vehicle.

For a single instance of this preferred embodiment of the present invention the energy capture would amount to the following:

$$E_{single\ system} = 367 \times 0.0056 = 2.05\ KWH \quad \text{[Equation 1]}$$

Such an instance capturing energy at the said rate would generate 18 MWH over the course of a year.

$$E_{annual\ single\ system} = 2.05 \times 24 \times 365.25 = 18.0\ MWH \quad \text{[Equation 2]}$$

Alternately, an array of such instance would be deployed in a high traffic density zone. For 600 2-axial vehicles passing per hour over modules positioned 10 feet apart, the energy (E) recaptured in one hour from one mile along one lane of deployed modules of the present invention is given by the following formula using an estimated efficiency conversion of 90% of the Electrical Generator and no rotational frictional loss by the axial coupling to the Motion Energy Harvesting Device:

$$E = 600 \times 528 \times 4 \times 2.05 \times 0.9\ \text{Kilowatt-hours or 2.33 Gigawatt-hours.} \quad \text{[Equation 3]}$$

Further efficiencies need to be considered if the electrical energy needs to be stored rather than delivered to the National Power Grid.

In a second preferred embodiment as shown in FIG. 5, the Motion Energy Harvesting Device comprises a plurality of air foils, 903, 905, 907. The air foils are arrayed in a helical manner shown in FIG. 5B as such an arrangement provides low threshold, omnidirectional activation and stability. Moreover, the air foils on the struts, e.g., 911, support rotational motion from fluid movement up or down. The rotational kinetic energy of the helical array of air foils converts translational air motion into rotational energy of an axial cylinder 909 from the mounting plate of the helices 1107 as shown in FIG. 5B thus driving the Electric Generator 1109. Vehicular traffic subjects a piezoelectric pad 1505 as shown in FIG. 6 to mechanical compression strain or displaced fluid exerts mechanical compression strain on a piezoelectric plate attached to the mounting columns 1309 as shown in FIG. 5C. The electrical signal thus generated serves to activate the electromagnets of the Electric Generator 1301 as the rotor of the Electric Generator is attached mechanically by an axial cylinder 1307 to the Motion Energy Harvesting Device 1101 whose helical vanes 1105 convert translational air motion into rotational energy of the dynamic inner rotor of the Electric Generator thus generating excess electrical energy that can be stored in the storage battery and/or sent to the electrical National Power Grid. The Computer-based electronic Controller 1111, 1311 will enable the brushless wound-rotor doubly-fed Electric Generator with resulting high power density, low cost, ultra-high efficiency (estimated to exceed 90%), and, symmetrically in motor operation, with ultra-high torque potential. This arrangement has the feature that variations in rotor speed due to fluctuations in wind speed can still result in synchronous delivery of power to the National Power Grid.

The plurality of helical air foil blades gives the Motion Energy Harvesting Device stability and allows it to rotate faster than the speed of the driving air current. Moreover, the Motion Energy Harvesting Device can capture energy from air current regardless of the direction of flow and at very low wind speeds. The rotor of the Electrical Generator is mounted vertically using low-friction, hydrostatic bearings rather than magnetic levitation as that would produce a flexible rather than a rigid mount. Moreover, such an arrangement would retain the capability of rotating in response to low velocity air motion. The Energy Harvesting System would be mounted beside the path of vehicles to take advantage of the differential lateral air pressure. Although Betz' law sets the upper limit of efficiency of a wind turbine at 59.3%, the efficiency achieved by the present invention is optimized to take advantage of the transient translational air motion.

The invention as described in the second embodiment can be deployed in a number of configurations adjacent to vehicular traffic as shown in FIGS. 6A and 6B. For example, the Wind-turbine driven Electric Generators 1503, 1507, 1703, 1709 are mounted in the wall of an underpass or tunnel with the piezoelectric pads 1505, 1509, 1705, 1707 under the roadbed in the direction of oncoming traffic. In tunnels or an underpass the Energy Harvesting Modules 1711, 1713 would be mounted above the road. Tunnels are often equipped with exhaust fans that could be supplemented with the Wind turbines of the present invention. Another location for placement of the Wind turbines of the present invention is on traffic dividers ("Jersey barriers" or K-rail). In the present invention the plurality of helical air foil blades of the Motion Energy Harvesting Device allow it to convert both traffic-generated air currents and ambient air currents into productive energy.

The amount of kinetic energy contained in the bulk displacement of air, $E_{KE}$, is given by:

$$E_{KE} = 0.5 \times M \times V(squared) \quad \text{[Equation 4]}$$

Where M is the mass of the air per cubic meter and V is the velocity of the wind. The amount of air moving past a given point, e.g., the helical air foil blades in the present invention, depends upon the velocity of the wind so the power generated per unit area per unit time, $P_{A, T}$, is given by:

$$P_{A, T} = 0.5 \times 9.8 \times M \times V(cubed) \quad \text{[Equation 5]}$$

Where one kilogram-force meter per second is equal to 9.8 watts.

The mass of cubic meter of air depends on density, which varies with altitude and temperature, and on moisture content. For dry air at sea level and 20-deg Celsius, the mass is 1.21 kg/m³. So for a cubic meter of such air moving at speed V, the power in watts generated per unit area per unit time would be given by the following:

$$P_{A, T} = 0.5 * 9.8 \times 1.2.1 \times V(cubed) \quad \text{[Equation 6]}$$

For a vehicle traveling at 60 mph (27 m/sec) consider a placement of a wind turbine as specified in the present invention such that the wind speed is 13.5 m/sec and the effective area presented by said wind turbine is 2 m squared, then the potential power produced per second by a single instance of the present invention in its second preferred embodiment is given by the following equation:

$$P_{WT} = 29.175\ KW \quad \text{[Equation 7]}$$

The effective power depends on the efficiency of the said wind turbine. The maximal efficiency given by Betz' law is 59.3%. So the upper bound on the effective power is given by the following equation:

$$P_E = 29.175 \times 0.593 = 17.300\ KW \quad \text{[Equation 8]}$$

If this single instance remained fully engaged at the rate of 17.3 KW per hour, it would generate 151.7 MWH over the course of a year.

Alternately, an array of said instances would be deployed. If instances of the present invention were position at 10 m intervals on either side of a lane then the total power per kilometer would be given by the equation:

$$P_{Tot} = 1.73 \text{ MW} \qquad \text{[Equation 9]}$$

If the present invention is deployed on a roadway where traffic density is sufficient to drive the turbines efficiently on average 10 hours per day, then the power generated over the course of a year is given by the equation:

$$P1_Y = 1.73 \times 10 \times 365 = 63.15 \text{ MWH} \qquad \text{[Equation 10]}$$

Similar considerations for placement of the present invention along a kilometer stretch of highway where the ambient wind is the dominant driver of the wind turbines. Since the average wind speed across the United States is 5 m/sec (10 mph), the power generated over the course of a year is given by the equation:

$$P2_Y = 7.7 \text{ MWH} \qquad \text{[Equation 11]}$$

In the deployment near dense traffic the ambient wind would become the dominant driving force during off peak times.

The power-recapture method and system of the present invention converts mechanical energy that would otherwise be dissipated into available electrical energy with high efficiency and optimal control and manageability. The present invention employs a novel approach with a plurality of Computer-coordinated Electric Generators arranged with salient sensors that detect appropriate motion then adjust the phasing and intensity of electromagnets of the Electric Generator to optimally convert variable mechanical motion into electric current.

While the invention has been described by reference to certain preferred embodiments, it should be understood that these embodiments are within the spirit and scope of the inventive concepts described. Accordingly, it is intended that the invention not be limited by the embodiments, but that various modifications, additions, and alterations may be made to the invention by one skilled in the art without departing from the spirit and full scope of the invention permitted by the language of the following claims.

We claim:

1. A system comprising a plurality of modules for converting mechanical energy into electrical energy and further comprising: a) Motion Energy Harvesting Device for recapture of mechanical rotational force; b) Electric Generator for alternating current generation from mechanical rotational force whereby the said Motion Energy Harvesting Device is connected to the said Electric Generator by mechanical means; c) Piezoelectric plate generating electrical power for the electro-magnets in the Electric Generator to maximize efficiency at high rates of rotation whereby the said piezoelectric plate is located so as to be activated in advance of vehicular activation of said Mechanical Energy Harvesting Device; d) Controller with rectifiers to convert the output of the one or more Electric Generators and Piezoelectric Plates to direct current for storage; and for supplying current to the electromagnets of one or more Electric Generators; e) Storage Battery to retain the energies generated by one or more Electric Generators and by one or more Piezoelectric Plates; f) Remotely communicating Computer to coordinate and monitor the power generation for maximum efficiency whereby the electrical power generation of one or more modules are measured for deviations from expected values and corrective actions can be taken by the said Controller.

2. The system of claim 1 in which the said modules are embedded in a transportation roadway to harvest mechanical rotational energy from passing vehicles.

3. The system of claim 1 in which the excess electrical energy is supplied to the electrical National Power Grid.

4. The system of claim 1 in which the said Computer is connected to the Internet for remote monitoring and control.

5. The system of claim 1 in which the Electric Generator is mounted above a second piezoelectric plate by means of low friction bearings.

6. The system of claim 1 in which the remotely communicating Computer is internet enabled for reporting traffic conditions.

7. The system of claim 1 in which Controller upon receipt of signal from the remote-sensing Computer can reverse the direction of motion of the Electrical Generator to provide braking action for at least one passing vehicle.

8. The system of claim 1 in which the said Piezoelectric Plates charge the said Storage Battery.

9. The system of claim 1 in which the outer surface of the Motion Energy Harvesting Device is a wear-resistant frictional material.

10. The system of claim 1 in which said first Piezoelectric Plates are mounted in front of said Electric Generators in the line of travel of passing vehicles.

11. The system of claim 1 in which the said Electric Generator is mounted by axial support by means of low friction bearings.

12. A system comprising a plurality of modules for converting mechanical energy into electrical energy and further comprising: a) Motion Harvesting Device for recapture of fluid motion energy and conversion to mechanical rotational force by means of a turbine; b) Electric Generator for alternating current generation from mechanical rotational force of the said Motion Harvesting Device whereby the said Motion Energy Harvesting Device is connected to the said Electric Generator by mechanical means; c) Piezoelectric plate for generating electrical power for the electro-magnets in the Electric Generator to maximize efficiency at high rates of rotation whereby the said piezoelectric plate is located as to be activated in advance of vehicular activation of said Mechanical Energy Harvesting Device; d) Controller with rectifiers to convert the output of the one or more Electric Generators and Piezoelectric Plates to direct current for storage; and for supplying current to the electromagnets of one or more Electric Generators; e) Storage Battery to retain the energies generated by one or more Electric Generators and by one or more Piezoelectric Plates; f) Computer to coordinate and monitor the power generation for maximum efficiency whereby the electrical power generation of one or more modules are measured for deviations from expected values and corrective actions can be taken by the said Controller.

13. The system of claim 12 in which the said modules are embedded in a transportation roadway to harvest fluid motion energy from passing vehicles.

14. The system of claim 12 in which the excess electrical energy is directly transmitted to the electrical National Power Grid.

15. The system of claim 12 in which the said Computer is connected to the Internet for remote monitoring and control.

16. The system of claim 12 in which the Electric Generator is mounted above a second piezoelectric plate.

17. The system of claim 12 for tunnel-mounted Electrical Generators in which the Controller upon receipt of signal from the remote-sensing Computer can reverse the direction of motion of the Electrical Generator to provide ventilation.

18. The system of claim 12 in which the said Piezoelectric Plates charge the said Storage Battery.

19. The system of claim 12 in which the said Piezoelectric Plates are mounted below said Electric Generators and affixed to the roadway in the line of travel of vehicles.

20. The system of claim 12 in which at least one Motion Energy Harvesting Device is mounted on at least one roadway traffic divider.

* * * * *